United States Patent
Yang et al.

(10) Patent No.: US 8,957,893 B2
(45) Date of Patent: *Feb. 17, 2015

(54) 3D DISPLAY APPARATUS AND 3D DISPLAY SYSTEM

(75) Inventors: Zan Yang, Guangdong (CN); Chih-Wen Chen, Guangdong (CN); Chia-Chiang Hsiao, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 243 days.

This patent is subject to a terminal disclaimer.

(21) Appl. No.: 13/636,163

(22) PCT Filed: Aug. 31, 2012

(86) PCT No.: PCT/CN2012/080865
§ 371 (c)(1),
(2), (4) Date: Sep. 20, 2012

(87) PCT Pub. No.: WO2013/185418
PCT Pub. Date: Dec. 19, 2013

(65) Prior Publication Data
US 2013/0335305 A1 Dec. 19, 2013

(30) Foreign Application Priority Data
Jun. 14, 2012 (CN) .......................... 2012 1 0196511

(51) Int. Cl.
*G06T 15/00* (2011.01)

(52) U.S. Cl.
USPC ............................................ 345/419; 345/694

(58) Field of Classification Search
USPC .................. 345/32, 419, 694; 353/7; 359/458
See application file for complete search history.

(56) References Cited

U.S. PATENT DOCUMENTS 8,766,976 B2 * 7/2014 Yang et al. .................... 345/419

* cited by examiner

*Primary Examiner* — Abbas Abdulselam
(74) *Attorney, Agent, or Firm* — Kirton McConkie; Evan R. Witt

(57) ABSTRACT

The present invention provides a three-dimensional (3D) display apparatus and a 3D system. The system comprises the 3D display apparatus and polarizer glasses. The 3D display apparatus comprises a display panel and a pattern retarder film. Retarder rows of the pattern retarder film are positioned to pixel row pairs of the display panel, respectively. The present invention can mitigate the image crosstalk problem exiting in the conventional 3D display.

17 Claims, 4 Drawing Sheets

3D DISPLAY APPARATUS AND 3D DISPLAY SYSTEM

FIELD OF THE INVENTION

The present invention relates to a display apparatus and a display system, and more particularly to a three-dimensional (3D) display apparatus and a 3D display system for displaying 3D images.

BACKGROUND OF THE INVENTION

Recently, with technological advantages, many types of display apparatus have been widely applied in flat panel displays (FPDs), such as liquid crystal displays (LCDs), electro luminescence (EL) displays or organic light-emitting diode (OLED) displays.

At present, the FPDs are capable of having a 3D image displaying function. For example, a 3D pattern retarder display which has a pattern retarder film is disposed at an outer side of the display.

In general, the 3D display having the pattern retarder film has left image pixels and right image pixels. The left image pixels are positioned at odd pixel rows (or even pixel rows) of the display, and the right image pixels are positioned at the other pixel rows thereof. When the light of the display passes through the quarter-wave phase retarders with different orientations, the light is transformed into a left handed circularly polarized light and a right handed circularly polarized light, respectively. A user can use circular polarizer glasses with different polarized directions such that the user's left eye only sees images of the left image pixels, and the user's right eye only sees images of the right image pixels. Therefore, the 3D image effect is achieved.

However, when a definition of the 3D display is raised, a pixel size of the 3D display will be reduced, and thus an image crosstalk there-between easily arises, deteriorating the 3D display quality. At this time, the image crosstalk can be mitigated by increase a width of a black matrix between pixels. However, the increase of the width of a black matrix will decrease an aperture ratio of the pixels.

As a result, it is necessary to provide a 3D display apparatus and a 3D display system to solve the problems existing in conventional technologies such as above-mentioned.

SUMMARY OF THE INVENTION

The present invention provides a 3D display apparatus and a 3D system, so as to mitigate the image crosstalk problem exiting in the conventional 3D display.

A primary object of the present invention is to provide a 3D display apparatus, and the 3D display apparatus comprises: a display panel including a plurality of first pixel row pairs and a plurality of second pixel row pairs arranged in an alternating manner, wherein each of the first pixel row pairs includes two adjacent first pixel rows, and each of the second pixel row pairs includes two adjacent second pixel rows; and a pattern retarder film disposed at a light emitting side of the display panel, wherein the pattern retarder film includes a plurality of first retarder rows and a plurality of second retarder rows, and the first retarder rows are positioned to the first pixel row pairs, respectively, and the second retarder rows are positioned to the second pixel row pairs, respectively.

Another object of the present invention is to provide a 3D display apparatus, and the 3D display apparatus comprises: a display panel including a plurality of first pixel row pairs and a plurality of second pixel row pairs arranged in an alternating manner, wherein each of the first pixel row pairs includes two adjacent first pixel rows, and each of the second pixel row pairs includes two adjacent second pixel rows, and a width of each of the first pixel rows or the second pixel rows is equal to or less than 350 um; and a pattern retarder film disposed at a light emitting side of the display panel, wherein the pattern retarder film includes a plurality of first retarder rows and a plurality of second retarder rows, and the first retarder rows are positioned to the first pixel row pairs, respectively, and the second retarder rows are positioned to the second pixel row pairs, respectively; wherein a width of each of the first retarder rows is larger or equal to a width of each of the first pixel row pairs, and a width of each of the second retarder rows is larger or equal to a width of each of the second pixel row pairs.

In one embodiment of the present invention, the width of each of the first pixel rows or the second pixel rows is of 350 um.

In one embodiment of the present invention, the width of each of the first pixel rows or the second pixel rows is of 315 um.

In one embodiment of the present invention, each of the first pixel rows or the second pixel rows comprises a plurality of pixel, and each of the pixels includes more than one sub-pixels.

In one embodiment of the present invention, a length of each of the sub-pixels is equal to or less than 350 um.

In one embodiment of the present invention, a width of each of the sub-pixels is equal to or less than 150 um.

In one embodiment of the present invention, a width of each of the first retarder rows is larger or equal to a width of each of the first pixel row pairs, and a width of each of the second retarder rows is larger or equal to a width of each of the second pixel row pairs In one embodiment of the present invention, a width of each of the first retarder rows or the second retarder rows is equal to or less than 650 um.

In one embodiment of the present invention, when displaying 3D images, a partial region of one of the first pixel rows of each of the first pixel row pairs is turned off.

Still another object of the present invention is to provide a 3D display system, and the 3D system comprises polarizer glasses and a 3D display apparatus. The 3D display apparatus comprises: a display panel including a plurality of first pixel row pairs and a plurality of second pixel row pairs arranged in an alternating manner, wherein each of the first pixel row pairs includes two adjacent first pixel rows, and each of the second pixel row pairs includes two adjacent second pixel rows; and a pattern retarder film disposed at a light emitting side of the display panel, wherein the pattern retarder film includes a plurality of first retarder rows and a plurality of second retarder rows, and the first retarder rows are positioned to the first pixel row pairs, respectively, and the second retarder rows are positioned to the second pixel row pairs, respectively.

In comparison with the conventional 3D display having the image crosstalk problem, the image crosstalk can be greatly reduced in the 3D display apparatus and the 3D system of the present invention, and a high definition can be achieved therein. Furthermore, due to the reduction of the image crosstalk, it is not required to increase the width of the shading BM between the pixels, thereby enhancing the aperture ratio of the pixels.

The structure and the technical means adopted by the present invention to achieve the above-mentioned and other"

objects can be best understood by referring to the following detailed description of the preferred embodiments and the accompanying drawings.

DETAILED DESCRIPTION OF THE PREFERRED EMBODIMENTS

Figure 1:
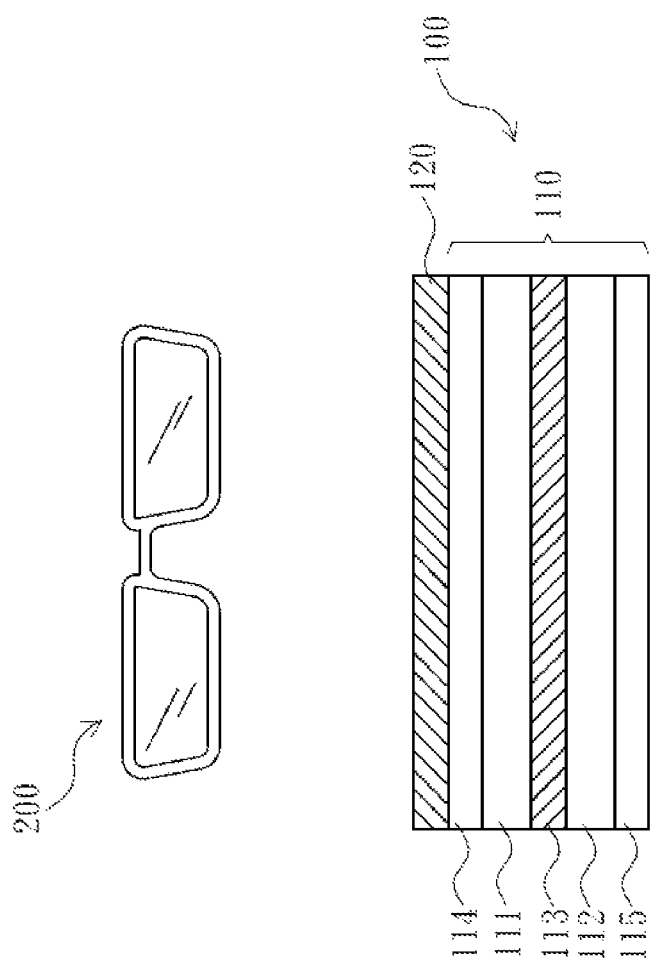
FIG. 1 is a schematic diagram showing a 3D display system according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top on the basis of a gravity direction.

Referring to FIG. 1, a schematic diagram showing a 3D display system according to one embodiment of the present invention is illustrated. The 3D display system of the present embodiment comprises a 3D display apparatus 100 and polarizer glasses 200. The 3D display apparatus 100 is configured to display 3D images. The 3D display apparatus 100 can comprise a display panel 110 and a pattern retarder film 120. The display panel 110 may be an LCD panel or an OLED panel for displaying images. The pattern retarder film 120 is disposed at a light emitting side of the display panel 110 for forming different polarized light rays, such as left or right handed circularly polarized light rays. When a user views the 3D images of the 3D display apparatus 100 of the present embodiment, the polarizer glasses 200 is utilized to cooperate with the 3D display apparatus 100 for forming a 3D image effect.

Referring to FIG. 1 again, in this embodiment, the display panel 110 may be the LCD panel which comprises a first substrate 111, a second substrate 112, a liquid crystal layer 113, a first polarizer 114 and a second polarizer 115. The first substrate 111 and the second substrate 112 may be realized as glass substrates or flexible plastic substrates. In this embodiment, the first substrate 111 may be a glass substrate or other material substrates with color filters (CF), and the second substrate 112 may be a glass substrate or other material substrates with a thin film transistor (TFT) array. It should be noted that the color filters and the TFT array may also be disposed on the same substrate in other embodiments.

Referring to FIG. 1 again, the liquid crystal layer 113 is formed between the first substrate 111 and the second substrate 112. The first polarizer 114 is disposed on an outer side of the first substrate 111 and opposite to the liquid crystal layer 113. The second polarizer 115 is disposed on an outer side of the second substrate 112. The pattern retarder film 120 is disposed at a light emitting side of the display panel 110, and more specifically, the pattern retarder film 120 is disposed on an outer surface of the first polarizer 114.

Figure 2:
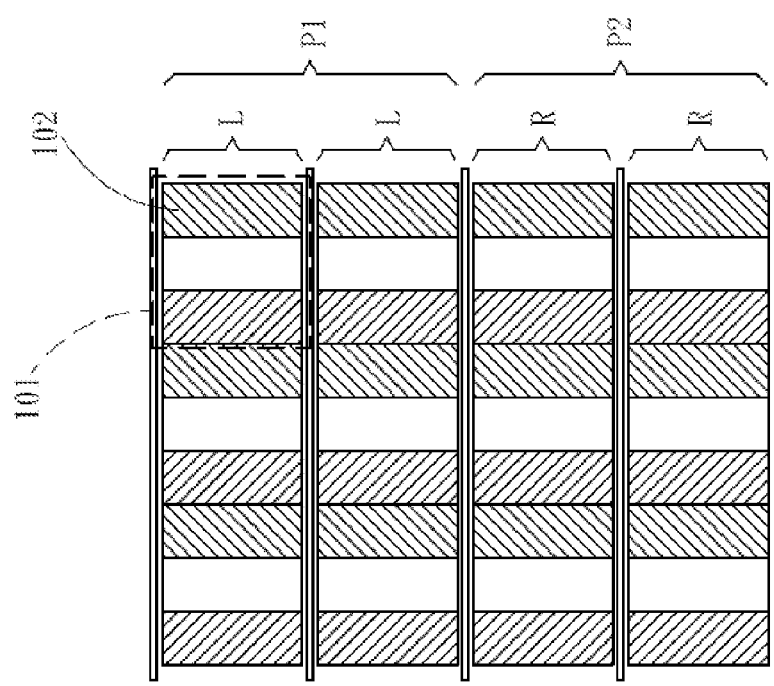
FIG. 2 is a schematic diagram showing a pixel arrangement of the display panel according to one embodiment of the present invention.

Referring to FIG. 2, a schematic diagram showing a pixel arrangement of the display panel according to one embodiment of the present invention is illustrated. The display panel 110 can include a plurality of first pixel row pairs P1 and a plurality of second pixel row pairs P2 arranged in an alternating manner. In this case, each of the first pixel row pairs P1 includes two adjacent first pixel rows L, and each of the second pixel row pairs P2 includes two adjacent second pixel rows R. Therefore, the first pixel rows L and the second pixel rows R can be arranged in a sequence of L-L-R-R-L-L-R-R . . . , and in this embodiment, the first pixel rows L may be configured to provide left eye images for the user's left eye, and the second pixel rows R may be configured to provide right eye images for the user's right eye. Each of the first pixel rows L or the second pixel rows R can comprise a plurality of pixel 101, and each of the pixel 101 can include more than one sub-pixels 102. For example, each of the pixels 101 can comprise three sub-pixels 102 corresponding to red, green and blue color filters. A length of each of the sub-pixels 102 may be equal to or less than 350 um. That is, a width of each of the first pixel rows L or the second pixel rows R may be equal to or less than 350 um, such as 315 um. A width of each of the sub-pixels 102 may be equal to or less than 150 um, such as 105 um.

Figure 3:
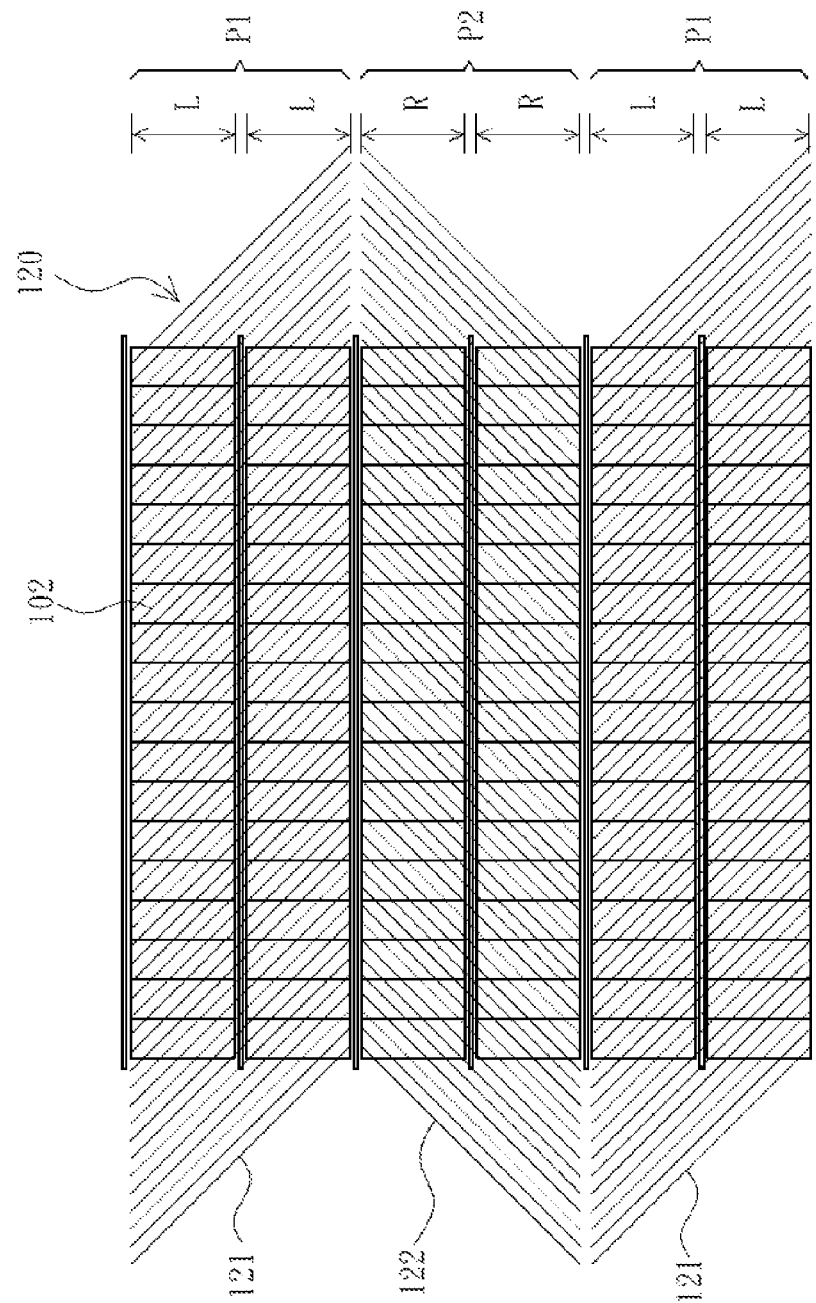
FIG. 3 is a schematic diagram showing the pixel arrangement of the display panel and the pattern retarder film according to one embodiment of the present invention.

Referring to FIG. 3, a schematic diagram showing the pixel arrangement of the display panel and the pattern retarder film according to one embodiment of the present invention is illustrated. The pattern retarder film 120 is disposed at the light emitting side of the display panel 110, wherein the pattern retarder film 120 includes a plurality of first retarder rows 121 and a plurality of second retarder rows 122 arranged in an alternating manner, and the first retarder rows 121 are positioned to the first pixel row pairs P1, and the second retarder rows 122 are positioned to the second pixel row pairs P2. A width of each of the first retarder rows 121 is preferably larger then or equal to the width of each of the first pixel row pairs P1, and a width of each of the second retarder rows 122 is preferably larger then or equal to the width of each of the second pixel row pairs P2. In this case, the width of each of the first retarder rows 121 or the second retarder rows 122 may be equal to or less than 650 um, such as 630 um.

Referring to FIG. 3 again, in this embodiment, the first retarder rows 121 or the second retarder rows 122 may be quarter-wave (λ/4) phase retarder rows. That is, the first retarder rows 121 or the second retarder rows 122 can have a characteristic of a normal λ/4 phase retarder, wherein an included angle between a slow axis of the first retarder rows 121 and a slow axis of the second retarder rows 122 is preferably of 90 degrees.

In another embodiment, the first retarder rows 121 can be half-wave (λ/2) phase retarder rows. That is, the first retarder rows 121 can have a characteristic of a normal λ/2 phase retarder. The second retarder rows 122 can be zero-wave phase retarder rows or λ/2 phase retarder rows having a slow axis in a direction different to the first retarder rows 121.

When the user uses the polarizer glasses 200 to view the 3D images of the 3D display apparatus 100, the left or right handed circularly polarized light rays can be formed by the pattern retarder film 120 of the 3D display apparatus 100. The left or right handed circularly polarized light rays are only allowed to pass through one side (a right side or a left side) of the polarizer glasses 200. In other words, the user's eyes can see images from different pixel rows of the 3D display apparatus 100, respectively, thereby forming the 3D image effect.

Referring to FIG. 3 again, when displaying the 3D images, in the same pixel row pair, the pixels 101 can provide the same images (the left or right eye images), and thus no image crosstalk occurs. Accordingly, it is only required to prevent the image crosstalk between the different pixel row pairs. Therefore, with the use of an arrangement of the pixel rows in the present invention, the image crosstalk between left and right image pixels can be reduced.

Figure 4:
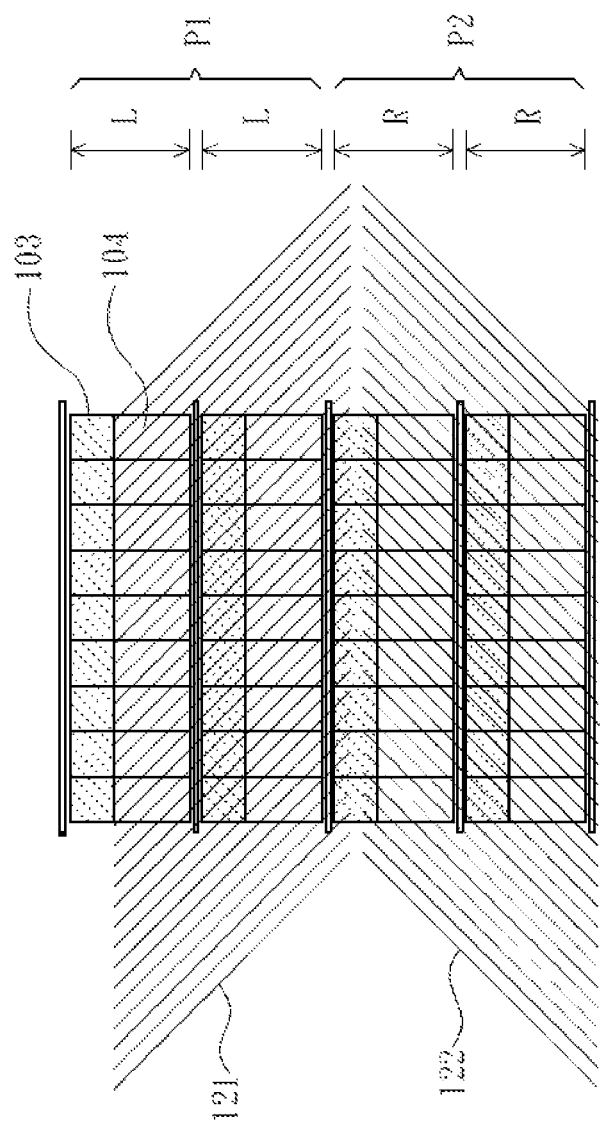
FIG. 4 is a schematic diagram showing a pixel arrangement of the display panel and a pattern retarder film according to another embodiment of the present invention.

Referring to FIG. 4, a schematic diagram showing a pixel arrangement of the display panel and a pattern retarder film according to another embodiment of the present invention is illustrated. In another embodiment, when displaying the 3D images, a partial region of one of the first pixel rows L of each of the first pixel row pairs P1 is turned off to form a dark state for acting as a black matrix (BM) between the first pixel row pairs P1 and the second pixel row pairs P2. For example, each of the sub-pixels 102 of the pixels 101 of the first pixel rows L can has a main-region 103 and a sub-region 104, wherein the main region 103 and the sub-region 104 have different liquid crystal (LC) pre-tilt angles, respectively. When displaying the 3D images in the 3D display apparatus 100, the main-regions 103 or the sub-regions 104 of each of the sub-pixels 102 can be turned off to form the dark state, and thus the turn-off main-regions 103 or sub-regions 104 of the sub-pixels 102 can act as the shading BM between the first pixel row pairs P1 and the second pixel row pairs P2.

As described above, in the 3D display apparatus and the 3D system of the present invention, a high definition (the length of the sub-pixels≤350 um) can be achieved, and the image crosstalk can be mitigated. Furthermore, due to the reduction of the image crosstalk, it is not required to increase the width of the shading BM between the pixels, thereby enhancing the aperture ratio of the pixels.

The present invention has been described above with a preferred embodiment thereof, and it is understood that many changes and modifications to the described embodiment can be carried out without departing from the scope and the spirit of the invention that is intended to be limited only by the appended claims.

The invention claimed is:

1. A three-dimensional (3D) display apparatus, comprising:
   a display panel including a plurality of first pixel row pairs and a plurality of second pixel row pairs arranged in an alternating manner, wherein each of the first pixel row pairs includes two adjacent first pixel rows, and each of the second pixel row pairs includes two adjacent second pixel rows, and a width of each of the first pixel rows or the second pixel rows is equal to or less than 350 um; and
   a pattern retarder film disposed at a light emitting side of the display panel, wherein the pattern retarder film includes a plurality of first retarder rows and a plurality of second retarder rows, and the first retarder rows are positioned to the first pixel row pairs, respectively, and the second retarder rows are positioned to the second pixel row pairs, respectively;
   wherein a width of each of the first retarder rows is larger or equal to a width of each of the first pixel row pairs, and a width of each of the second retarder rows is larger or equal to a width of each of the second pixel row pairs.

2. The 3D display apparatus according to claim 1, wherein the width of each of the first pixel rows or the second pixel rows is of 315 um.

3. The 3D display apparatus according to claim 1, wherein each of the first pixel rows or the second pixel rows comprises a plurality of pixel, and each of the pixels includes more than one sub-pixels.

4. The 3D display apparatus according to claim 3, wherein a length of each of the sub-pixels is equal to or less than 350 um.

5. The 3D display apparatus according to claim 3, wherein a width of each of the sub-pixels is equal to or less than 150 um.

6. The 3D display apparatus according to claim 1, wherein a width of each of the first retarder rows or the second retarder rows is equal to or less than 650 um.

7. The 3D display apparatus according to claim 1, wherein, when displaying 3D images, a partial region of one of the first pixel rows of each of the first pixel row pairs is turned off.

8. A 3D display apparatus, comprising:
   a display panel including a plurality of first pixel row pairs and a plurality of second pixel row pairs arranged in an alternating manner, wherein each of the first pixel row pairs includes two adjacent first pixel rows, and each of the second pixel row pairs includes two adjacent second pixel rows; and
   a pattern retarder film disposed at a light emitting side of the display panel, wherein the pattern retarder film includes a plurality of first retarder rows and a plurality of second retarder rows, and the first retarder rows are positioned to the first pixel row pairs, respectively, and the second retarder rows are positioned to the second pixel row pairs, respectively.

9. The 3D display apparatus according to claim 8, wherein the width of each of the first pixel rows or the second pixel rows is of 350 um.

10. The 3D display apparatus according to claim 9, wherein the width of each of the first pixel rows or the second pixel rows is of 315 um.

11. The 3D display apparatus according to claim 8, wherein each of the first pixel rows or the second pixel rows comprises a plurality of pixel, and each of the pixels includes more than one sub-pixels.

12. The 3D display apparatus according to claim 11, wherein a length of each of the sub-pixels is equal to or less than 350 um.

13. The 3D display apparatus according to claim 11, wherein a width of each of the sub-pixels is equal to or less than 150 um.

14. The 3D display apparatus according to claim 8, wherein a width of each of the first retarder rows is larger or equal to a width of each of the first pixel row pairs, and a width of each of the second retarder rows is larger or equal to a width of each of the second pixel row pairs.

15. The 3D display apparatus according to claim 8, wherein a width of each of the first retarder rows or the second retarder rows is equal to or less than 650 um.

16. The 3D display apparatus according to claim 8, wherein, when displaying 3D images, a partial region of one of the first pixel rows of each of the first pixel row pairs is turned off.

17. A 3D display system, comprising:
   polarizer glasses; and
   a 3D display apparatus comprising:
      a display panel including a plurality of first pixel row pairs and a plurality of second pixel row pairs arranged in an alternating manner, wherein each of the first pixel row pairs includes two adjacent first pixel rows, and each of the second pixel row pairs includes two adjacent second pixel rows; and
      a pattern retarder film disposed at a light emitting side of the display panel, wherein the pattern retarder film includes a plurality of first retarder rows and a plurality of second retarder rows, and the first retarder rows are positioned to the first pixel row pairs, respectively, and the second retarder rows are positioned to the second pixel row pairs, respectively.

* * * * *